Oct. 7, 1958

H. G. FREEMAN 2,855,177

BALL VALVE CASING

Filed May 21, 1956

Inventor:
Howard G. Freeman,
by Arthur D. Thomson
Attorney

United States Patent Office 2,855,177
Patented Oct. 7, 1958

2,855,177

BALL VALVE CASING

Howard G. Freeman, Worcester, Mass., assignor to Jamesbury Corp., Worcester, Mass., a corporation of Massachusetts Application May 21, 1956, Serial No. 586,266

2 Claims. (Cl. 251—367)

This invention relates, in general, to ball valves and, in particular, to casings of the type made of two pieces joined endwise to enclose the ball.

One method of connecting the two pieces of this type of valve casing is to form one piece with a reduced neck which fits into a circular recess in the other, and to drive pins through the two pieces in their overlapping region.

This type of connection has good resistance to thrust in a direction tending to separate the two pieces and to vibration, but is considerably weaker under torsion. As a result the valve may be damaged if excessive torsional force is applied during assembly into the pipe line.

The object of this invention is to provide a valve casing connection which retains the advantages of the pin type of connection and also has high torsional strength. Another object is to provide a casing which can be readily assembled and dismantled. Other advantages of the invention will be apparent from the following description.

In the drawings illustrating the invention:

Figure 1:
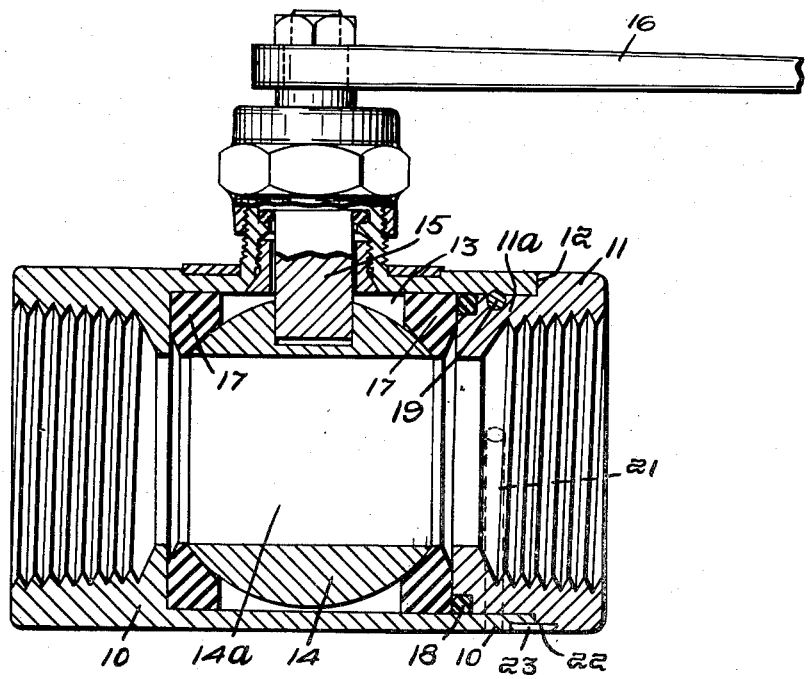
Fig. 1 is a longitudinal cross-section of a valve with a casing constructed according to the invention.
Figure 2:
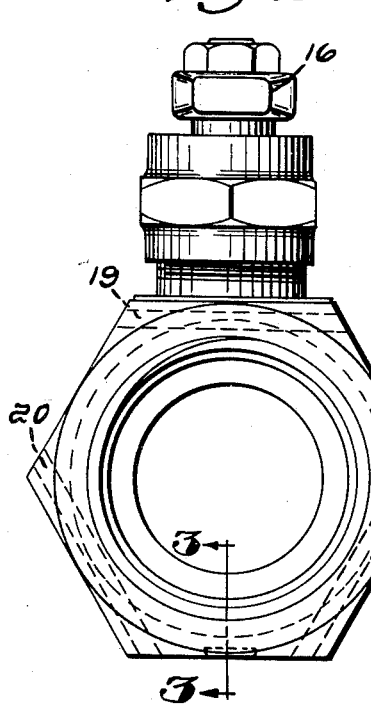
Fig. 2 is an end view of the valve.
Figure 3:
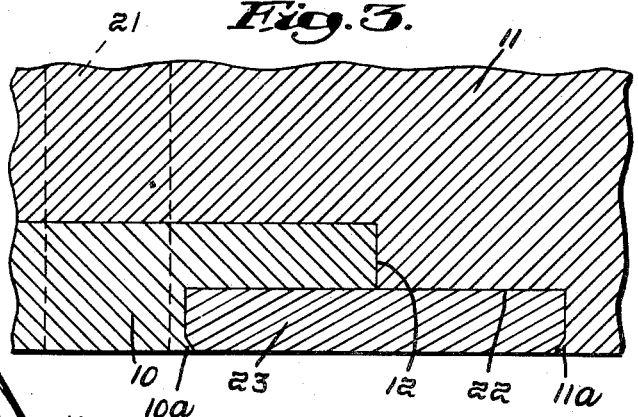
Fig. 3 is an enlarged fragmentary cross-section taken along line 3—3 of Fig. 2.

The valve casing is composed of two sections of a hexagon, 10 and 11, threaded at the ends for connection into the pipe line. These parts are preferably machined from hexagonal bar stock of a metal appropriate for the purpose. Section 11 has a reduced cylindrical portion 11a, which fits into the right-hand end of section 10, and a shoulder 12 against which the end of section 10 is seated. The two casing sections, when thus assembled, enclose a valve chamber 13 in which a ball 14, of conventional construction, is mounted. The ball has a passage 14a for the liquid, and is connected by a stem 15 to a handle 16 which is used to turn the ball in the customary manner. The valve is here shown as provided with a double-seat seal consisting of two gaskets 17 of the type described in my copending application Serial No. 436,188, filed June 11, 1954, but it is understood that the casing construction here described can be used for valves having conventional ball seats.

The section 11 preferably is recessed at its left-hand end to receive an O-ring 18 which forms a seal between the two sections. The two sections are drilled, when fitted together, to receive three pins 19, 20 and 21 which serve as the main connection for the sections. Each pin is disposed parallel to one of the outer faces of section 10 and extend to the adjoining faces. The pins are pressed into the drilled holes when the valve is fully assembled, and the valve can be subsequently dismantled by knocking the pins out.

When the two casing sections have been assembled with the pins, a circular recess 22 is bored in both pieces, with its center about in line with shoulder 12 so that approximately half of the recess is disposed in each piece. A solid metal disk 23 is set in this recess. This disk has a chamfered rim 23a around the face which lies to the outside. After the disk is set in place, the rims 10a and 11a around recess 22 are spun over the chamfered rim 23a. The disk bears any torsional stress applied to the valve, and both relieves the pins and keeps the valve tight, while it is being connected to piping.

The valve can be readily dismantled in the usual manner by knocking out the pins and pulling the sections apart endwise, as the disk although tightly secured, will slide out of one section or the other, even if the recess 22 is not perfectly centered. The valve is reassembled by sliding the two sections back together with the disk in place and inserting the pins. This construction, while greatly increasing the torsional strength of the casing, adds very little to the cost of assembly, and permits the valve to be dismantled in the customary manner.

What is claimed is:

1. In a valve of the type having a casing, including two generally tubular sections disposed in axial alignment; and means connecting said sections together; a rigid disk, said sections having adjoining recesses forming together a circular seat in which said disk is received, the disk having a chamfered rim disposed outward, and said sections having wall portions spun over said rim.

2. A device as described in claim 1, the disk having an axis disposed perpendicular to the axial direction of the sections and being slidable out of said recesses upon disconnection and separation of the sections in their axial direction.

References Cited in the file of this patent

UNITED STATES PATENTS

| | | |
|---|---|---|
| 685,851 | Kifer | Nov. 5, 1901 |
| 1,658,264 | Sutton | Feb. 7, 1928 |
| 2,762,601 | Clade | Sept. 11, 1956 |

FOREIGN PATENTS

| | | |
|---|---|---|
| 821,298 | Germany | Nov. 15, 1951 |